2,755,283

CERTAIN HALOGENATED LOWER ALKANAL ADDUCTS WITH NICOTINAMIDE

John A. Hill, New Brunswick, N. J., assignor to Olin Mathieson Chemical Corporation, New York, N. Y., a corporation of Virginia No Drawing. Application July 28, 1954,
Serial No. 446,389

6 Claims. (Cl. 260—295.5)

This invention relates to new chemical compositions, and more particularly to new adducts of halogenated alkanals, and their method of preparation.

Prior to this invention, halogenated alkanals, such as chloral, either in their free form or as hydrates, have been used as oral sedatives and hypnotics. These compounds, however, have certain characteristics which limit their usefulness as pharmaceuticals. Thus, they are in general hygroscopic and volatile, and hence unsuitable for use in solid unit-dosage forms such as tablets, two-piece gelatin capsules, and powders. Both chloral and chloral hydrate, for example, are relatively unstable and slowly volatilize on exposure to air; and both are irritating to the skin and possess a pungent odor and taste which renders them unsatisfactory for therapy by the oral route.

An object of this invention, therefore, is the provision of a halogenated alkanal-containing composition which is more stable and less hygroscopic than the free halogenated alkanal or its hydrate.

Another object of this invention is the preparation of a halogenated alkanal-containing composition which is relatively odorless as compared with the free halogenated alkanal or its hydrate.

Still another object of this invention is the provision of an adduct of a halogenated alkanal (preferably chloral hydrate) with nicotinamide which is eminently suitable as an oral sedative and hypnotic and is less irritating in the stomach than the free halogenated alkanal.

These objects are realized by the practice of this invention, which essentially comprises contacting a halogenated alkanal with nicotinamide, and recovering the adduct thus formed. These adducts are stable, non-hygroscopic, relatively odorless solids having a pharmacological activity similar to that of both the free halogenated alkanals and their hydrates. The adducts may be employed in various pharmaceutical forms, either per se or with suitable adjuvants and diluents, e. g. as powders, in dry-filled capsules, pressed into tablets and in the form of suppositories or other solid unit-dosage forms.

Suitable halogenated alkanals which may be reacted with the amides for the purposes of this invention include either the free anhydrous form or the hydrated form of aldehydes having the general formula:

$$C_nH_{2n+1-y}X_yCHO$$

wherein X is a halogen (preferably chlorine or bromine), $n$ is a positive integer (preferably less than seven), and $y$ is a positive integer less than $2n+2$ (preferably three). Examples of utilizable halogenated alkanals include bromal (tribromoacetaldehyde), chloral (trichloroacetaldehyde), and trichlorinated butanals (e. g. 2,2,3-trichlorobutanal). Of these, chloral hydrate is preferred.

The reaction may be carried out at room temperature, preferably initiating the reaction at that temperature and then reducing the temperature to about 5° C. The amide and the alkanal may be mixed in any proportions; preferably, however, equimolar proportions of alkanal and amide are used. Although the process may be carried out by directly mixing the alkanal and amide in the absence of a solvent where one of the reactants is a liquid or liquefiable, for ease of reaction, it is advantageous that the reactants first be dissolved in a suitable solvent such as water and the solutions thus formed, mixed together. Crystals of the adduct are produced, and may be removed by filtration and dried. The adduct contains about 50 to 65% of alkanal (calculated as the hydrate).

The adduct is a crystalline, water-soluble, non-hygroscopic, stable solid complex which retains the full activity of the halogenated alkanal component.

The following example illustrates a suitable method for preparing the adducts of this invention:

Example

To one mole (165.4 g.) of chloral hydrate in a saturated aqueous solution is added a solution of 1 mole (122.1 g.) of nicotinamide in 225 ml. of water. Upon scratching the walls of the reaction vessel or seeding, crystals deposit. The mixture is then allowed to stand for about 3 hours at 5° C. after which the mixture is filtered and the residue dried in air and then with anhydrous calcium chloride.

These crystals have only a slight chloral hydrate odor. They melt at about 90–91° C. and are very soluble in water, methanol, ethanol and isopropanol. They are practically insoluble in chloroform. Analysis indicates that the adduct contains approximately 60.8% chloral hydrate.

By substituting bromal hydrate for chloral hydrate in the above example, an adduct of bromal hydrate and nicotinamide is obtained.

The chloral hydrate-nicotinamide adduct, for example, is well adsorbed orally, as determined by trichloroethanol plasma concentration, and has at least the degree of oral activity expected from its chloral hydrate content.

The chloral-nicotinamide complex, for example, may be administered, as such, in the form of a powder or dry-filled capsule, or formulated into a tablet or suppository in the manner well known in the art.

The invention may be variously otherwise embodied within the scope of the appended claims.

I claim:

1. The process for preparing an adduct of a halogenated lower alkanal, wherein the halogen is selected from the group consisting of chlorine and bromine, and nicotinamide which comprises contacting a halogenated lower alkanal, wherein the halogen is selected from the group consisting of chlorine and bromine, with nicotinamide at substantially room temperature and recovering the adduct thus formed.

2. The process of claim 1 wherein approximately one mole of alkanal is used per mole of nicotinamide.

3. The process of claim 2 wherein the alkanal is chloral hydrate.

4. An adduct of a halogenated lower alkanal, wherein the halogen is selected from the group consisting of chlorine and bromine, and nicotinamide, prepared by the method of claim 1.

5. An adduct of a halogenated lower alkanal, wherein the halogen is selected from the group consisting of chlorine and bromine, and nicotinamide, prepared by the method of claim 2.

6. An adduct of chloral hydrate and nicotinamide, prepared by the method of claim 3.

References Cited in the file of this patent

FOREIGN PATENTS

| | | |
|---|---|---|
| 198,715 | Germany | Apr. 24, 1907 |
| 234,741 | Germany | June 7, 1910 |

OTHER REFERENCES

Coppin et al.: J. Chem. Soc. (London), vol. 105, pp. 32–6 (1914).

Byrum et al.: J. Am. Pharm. Assoc., Sci. Ed., vol. 41, pp. 100–2 (1952).

La Rocca et al.: J. Org. Chem., vol. 16, pp. 47–50 (1951).

Simons: Ind. and Eng. Chem., vol. 39, p. 238 (1947).

U. S. Dispensatory, 24th ed. (1947), pp. 259–60